(12) United States Patent
Mickle et al.

(10) Patent No.: US 7,383,064 B2
(45) Date of Patent: Jun. 3, 2008

(54) RECHARGING METHOD AND ASSOCIATED APPARATUS

(75) Inventors: Marlin H. Mickle, Pittsburgh, PA (US); Christopher C. Capelli, Houston, TX (US); Harold Swift, Gibsonia, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 11/266,139

(22) Filed: Nov. 3, 2005

(65) Prior Publication Data

US 2006/0058076 A1    Mar. 16, 2006

Related U.S. Application Data

(62) Division of application No. 10/843,792, filed on May 11, 2004.

(60) Provisional application No. 60/472,052, filed on May 20, 2003.

(51) Int. Cl.
*H04B 1/38* (2006.01)
*H04B 1/00* (2006.01)

(52) U.S. Cl. .................. 455/573; 455/343.1; 320/107; 343/707

(58) Field of Classification Search ........ 455/572–574, 455/575.1, 90.3, 41.1, 41.2, 90.1, 90.2, 333, 455/344, 128–129, 343.1, 550.1, 127.1, 127.5, 455/343.5, 343.6, 291–292; 343/701–703, 343/722, 720; 320/107, 124, 127, 102, 137–138
See application file for complete search history.

(56) References Cited

U.S. PATENT DOCUMENTS

| | | | |
|---|---|---|---|
| 3,678,305 A * | 7/1972 | Paige | 310/313 B |
| 4,114,151 A | 9/1978 | Denne et al. | |
| 4,471,344 A | 9/1984 | Williams | |
| 4,857,893 A | 8/1989 | Carroll | |
| 5,296,866 A | 3/1994 | Sutton | |
| 5,523,659 A * | 6/1996 | Swenson | 315/506 |
| 5,673,018 A | 9/1997 | Lowe et al. | |
| 5,889,383 A | 3/1999 | Teich | |

(Continued)

FOREIGN PATENT DOCUMENTS

EP    1263114    12/2002

(Continued)

OTHER PUBLICATIONS

U.S. Appl. No. 09/951,032, filed Sep. 10, 2001, M. H. Mickle et al.

(Continued)

*Primary Examiner*—Pablo N. Tran
(74) *Attorney, Agent, or Firm*—Philip E. Levy; Eckert Seamans Cherin & Mellott, LLC

(57) ABSTRACT

The present invention provides apparatus and an associated method for remotely energizing power storage devices. Energization may preferably be effected through the use of RF energy within frequencies of the wireless fidelity standards. The remote station preferably has at least one antenna having an effective area greater than its physical area. The invention may advantageously be used on wireless fidelity products which are energized by the power storage device.

22 Claims, 3 Drawing Sheets

U.S. PATENT DOCUMENTS

| | | | |
|---|---|---|---|
| 5,952,814 | A | 9/1999 | Van Lerberghe |
| 5,970,398 | A | 10/1999 | Tuttle |
| 6,037,743 | A | 3/2000 | White et al. |
| 6,054,925 | A | 4/2000 | Proctor et al. |
| 6,100,804 | A | 8/2000 | Brady et al. |
| 6,127,799 | A | 10/2000 | Krishnan |
| 6,130,603 | A | 10/2000 | Briechle |
| 6,177,872 | B1 | 1/2001 | Kodukula et al. |
| 6,184,651 | B1 | 2/2001 | Fernandez et al. |
| 6,184,789 | B1 | 2/2001 | Richley et al. |
| 6,229,443 | B1 * | 5/2001 | Roesner ............... 340/572.1 |
| 6,284,651 | B1 | 9/2001 | Sharan et al. |
| 6,289,237 | B1 | 9/2001 | Mickle et al. |
| 6,310,465 | B2 | 10/2001 | Najima |
| 6,335,686 | B1 | 1/2002 | Goff et al. |
| 6,373,447 | B1 | 4/2002 | Rostoker et al. |
| 6,463,039 | B1 | 10/2002 | Ricci et al. |
| 6,480,699 | B1 * | 11/2002 | Lovoi ................... 455/41.2 |
| 6,563,319 | B1 * | 5/2003 | Kraz ..................... 324/458 |
| 6,603,309 | B2 * | 8/2003 | Forgang et al. ......... 324/303 |
| 6,611,783 | B2 * | 8/2003 | Kelly et al. ............ 702/150 |
| 6,744,335 | B2 * | 6/2004 | Ryhanen et al. ........ 333/185 |
| RE38,547 | E * | 7/2004 | Hartai ................ 315/209 R |
| 6,789,429 | B2 * | 9/2004 | Pinto et al. ............ 73/718 |
| 6,803,774 | B2 * | 10/2004 | Park ..................... 324/661 |
| 6,842,606 | B1 | 1/2005 | Takemura |
| 6,882,128 | B1 * | 4/2005 | Rahmel et al. ......... 320/101 |
| 6,907,231 | B2 * | 6/2005 | Bhatti ................ 455/127.1 |
| 6,995,731 | B2 * | 2/2006 | Lin ..................... 343/895 |
| 7,002,174 | B2 * | 2/2006 | Il'ichev et al. ........... 257/14 |
| 7,081,386 | B2 * | 7/2006 | Ozawa et al. .......... 438/259 |
| 2001/0042920 | A1 * | 11/2001 | Iwasaki et al. ......... 257/758 |

FOREIGN PATENT DOCUMENTS

| | | |
|---|---|---|
| JP | 10-257697 | 9/1998 |
| JP | 2000-137779 | 5/2000 |
| JP | 2002-078247 | 3/2002 |
| WO | 98/52155 | 11/1998 |
| WO | 2003/023979 | 3/2003 |
| WO | 2004/021467 | 3/2004 |

OTHER PUBLICATIONS

U.S. Appl. No. 60/406,541, filed Aug. 28, 2002, M. H. Mickle et al.

U.S. Appl. No. 60/411,845, filed Sep. 28, 2002, M. H. Mickle et al.

U.S. Appl. No. 60/472,052, filed May 20, 2003, M. H. Mickle et al.

Soohoo, "Magnetic Thin Film Inductors for Integrated Circuit Applications," IEEE Transactions in Magnetic, vol. MAG-15, No. 6, pp. 1803-1805 (Nov. 1979).

Salch and Qureshi, "Permalloy ThinFilm Inductors," Electronic Letters, vol. 6, No. 26, pp. 850-852 (Dec. 31, 1970).

Rheinhold Rudenberg, "The Receipt of Electric Waves in the Wireless Telegraphy," Annalen den Physik IV, 25, 1908, p. 466.

Young-Ho Shu et al, "A High-Efficiency Dual-Frequency Rectenna for 2.45- and 5.8-GHz Wireless Power Transmission", IEEE Transactions on Microwave Theory and Techniques, IEEE Service Center, Piscataway, NJ, vol. 50, No. 7, Jul. 2002.

"A 0.5-mW Passive Telemetry IC for Biomedical Applications", by Quiting Huang et al., IEEE Journal of Solid-State Circuits, vol. 33, No. 7, Jul. 1998.

"A Broadband Rectenna Array for RF Energy Recycling", by Florian B. Helmbrecht, University of Colorado at Boulder, submitted to the Technische Universitat Munchen, Sep. 2002.

"A High Conversion Efficiency 5.8 GHz Rectenna", by James O. McSpadden et al., 1997 MTT-S Digest.

"ASIC-Based Batteryless Implantable Telemetry Microsystem for Recording Purposes", by J. Parramon et al., Proceedings—19th International Conference—IEEE/EMBS Oct. 30-Nov. 2, 1997 Chicago, IL. USA.

A Wireless Implantable Multichannel Digital Neural Recording System for a Micromachined Sieve Electrode, by Tayfun Akin et al., IEEE Journal of Solid-State Circuits, vol. 33, No. 1, Jan. 1998.

"Energy Harvesting, Profiles, and Potential Sources", by Marlin Mickle et al, International Journal of Parallel and Distributed Systems and Networks, vol. 4, No. 3, 2001.

"Planar Rectennas for 2.45GHz Wireless Power Transfer", by Jouko Heikkinen et al., Tamrpere University of Technology, 0-7803-6267-5/00/$10.00 © IEEE.

"Wireless Telemetry for Gas-Turbine Applications", by Russell G. DeAnna, U.S. Army Research Laboratory, Glenn Research Center, Cleveland, Ohio, Mar. 2000, NASA/TM-2000-209815, ARL-MR-474.

* cited by examiner

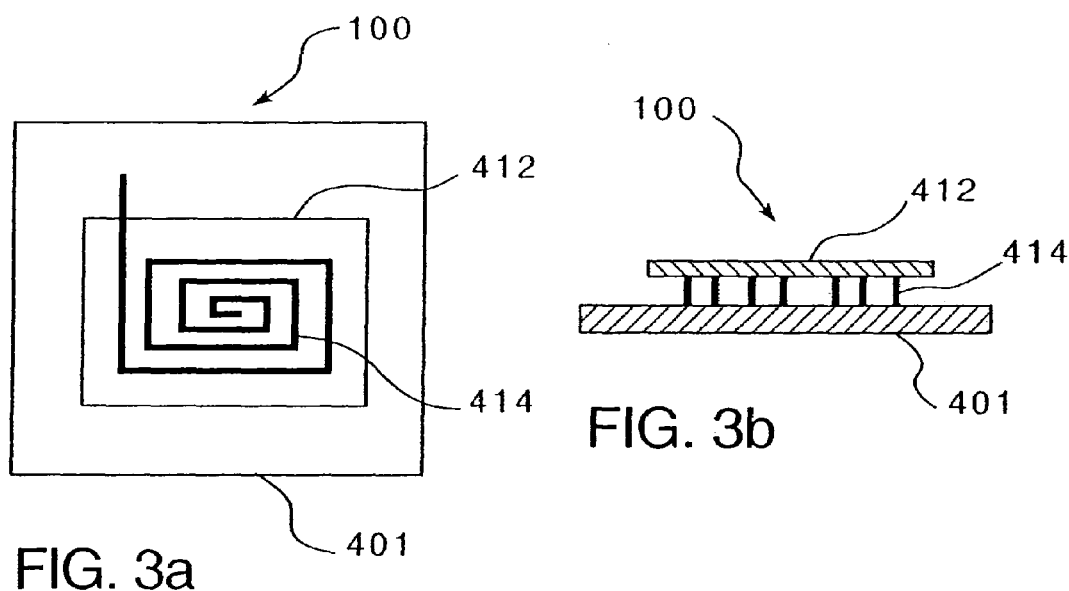
FIG. 3a
FIG. 3b
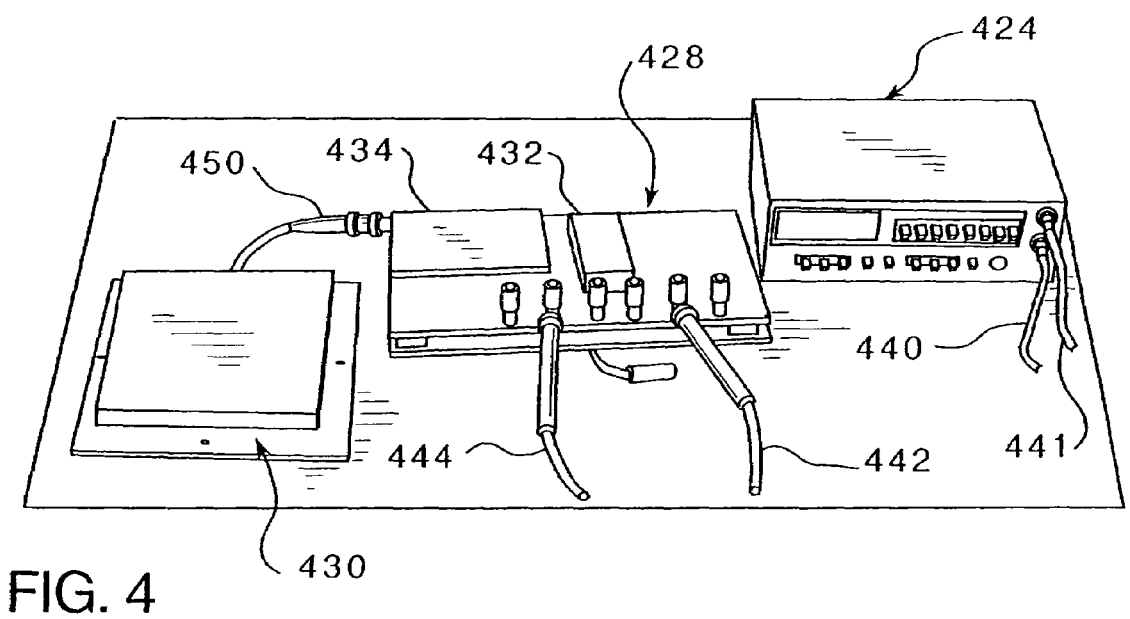
FIG. 4

RECHARGING METHOD AND ASSOCIATED APPARATUS

CROSS-REFERENCE TO RELATED APPLICATION

This application is a divisional of U.S. patent application Ser. No. 10/843,792 entitled "RECHARGIING METHOD AND ASSOCIATED APPARATUS" filed May 11, 2004, which claims the benefit of U.S. Provisional Application Ser. No. 60/472,052 entitled "RECHARGING METHOD AND ASSOCIATED APPARATUS" filed on May 20, 2003.

BACKGROUND OF THE INVENTION

1. Field of the Invention

This invention relates to a method and apparatus for remote energizing of power storage devices and particularly to a method and apparatus employing small apparatus for remote energizing of power storage devices using RF frequencies based on wireless frequencies. The method and apparatus of this invention preferably employs at least one antenna that has an effective area greater than its physical area to harvest energy.

2. Description of the Prior Art

Contactless electrical connections are well known in the field of portable electrical devices. For example, portable motorized toothbrushes typically contain a rechargeable battery, which is charged by induction. The inductive charging device is also called an electromagnetic, non-contact type battery charging device. The inductive charging device is advantageous in that it cannot be hindered by a bad electrical contact unlike the charging device that requires an electrical connection. Inductive charging devices typically consist of inductive coupler for transferring energy from a primary side of the inductive coupler on a charging device to a secondary side of the inductive coupler on the electronic device. Examples of inventions utilizing inductive charging include U.S. Pat. No. 6,284,651, U.S. Pat. No. 6,310,465 and U.S. Pat. No. 5,952,814. A major problem with inductive charging is that the charging device needs to be in close proximity to the electronic device in order to energized power storage devices in the electronic device.

To overcome the problems associated with inductive charging, charging devices using RF electromagnetic field radiated into free space have been described. U.S. Pat. No. 6,127,799 describes a charge storage device that is charged by exposing the charge storage device to an RF electromagnetic field radiated into free space within a closed system. The charge storage device includes one or more dipole antennas disposed on the device and adapted to receive the radiated RF electromagnetic field. One or more bridge rectifiers are connected to the antennas for rectifying the received RF electromagnetic field into a DC output current. The DC output current produced by the rectifier is used to energize the charge storage device.

As disclosed in U.S. Pat. No. 6,127,799, the antennas may be one or more dipole antennas which are combined to form at least two subsets of dipole antenna element arrays, wherein one subset may be oriented at an acute or a right angle with respect to at least one other subset. The antennas or dipole antennas may be placed on more than one outside surface of the charge storage device, which enclose an acute or a right angle with respect to each other. The use of RF energy and antennae to develop remote charging using the technology disclosed in U.S. Pat. No. 6,127,799 has a shortcoming in that the power conversion efficiency of the antenna array in the disclosed invention is dependent on the number of dipoles. Also, the size of the dipole antennas for the device do not make it practical for the majority of portable electronic devices (e.g., cellular telephones, portable electronic games, digital cameras and the like). In this prior disclosure, the dipole antennas are used to cover more than one side of a battery that has a width of 12.5 cm.

An approach to overcoming the problems of prior art is through the use of antennas formed on electronic chips. Examples of prior art that disclosed on-chip antennas include U.S. Pat. No. 4,857,893 and U.S. Pat. No. 6,373,447.

The preferred approach as detailed in U.S. Pat. No. 4,857,893 is to use a deposition technique that effectively creates a single monolithic chip assembly that includes all of the circuitry necessary to produce a functionally complete transponder unit. This patent discusses the use of magnetic film inductors on the chip to allow a reduction in the number of turns, and thereby make the fabrication of such inductors feasible. This patent referenced Soohoo, "Magnetic Thin Film Inductors For Integrated Circuit Applications", IEEE Transactions in Magnetic, Vol. MAG-15, No. 6, pp. 1803-1805 (November 1979). Another technique referenced in this patent was in Salch and Qureshi, "Permalloy ThinFilm Inductors", Electronic Letters, Vol. 6, No. 26, pp. 850-852 (Dec. 31, 1970).

This patent discusses the construction of the antenna on a chip as follows: A 10-turn square spiral coil for use at 10 MHz is constructed having an outer diameter of 1 cm×1 cm. The conducting path width is 0.005 inches. The spacing between turns is 0.001 in. The copper path is deposited by vacuum evaporation and then thickness is built up to about 25 micrometers by electroplating. Two permalloy magnetic films, having a thickness of from 1000-3000 Angstroms, surround the conductors, one on top, and the other on the bottom. The film is evaporated in an orienting magnetic field in such a way that the long dimension is parallel to the field, and thus it is the easy direction of magnetization of the film. When a high-frequency current passes in the coil, the magnetic films are driven in a hard direction, and the two magnetic films around each conductor act as a magnetic core enclosing a 1-turn coil. The effect of the magnetic films is to increase the inductance of the coil in addition to its free-space inductance. The magnetic permeability is quite large, since the films are driven in the hard direction. Further, an insulating silicon-monoxide layer (SiO, 10,000 A thick) separates each magnetic film from the conducting path.

The problem with the approach as disclosed by U.S. Pat. No. 4,857,893 is the need to deposit a permalloy magnetic film, or other suitable material having a large magnetic permability and electrical insulating properties in order increase the inductance of the coil. This increases the cost and complexity of the antenna of a chip. Furthermore, it limits the ability to shrink the size of the antenna because of the need for magnetic film layers between the antenna coil(s).

U.S. Pat. No. 6,373,447 discloses the use of one or more antennas that are formed on an integrated circuit (IC) chip and connected to other circuitry on the IC chip. Antenna configurations are disclosed that include loop, multi-turn loop, square spiral, long wire, or dipole. The antenna as disclosed could be formed to have two or more segments, which can selectively be connected to one another to alter an effective length of the antenna. Furthermore, two antennas may be formed in two different metallization layers separated by an insulating layer. A major shortcoming of this prior art is that the inventors teach that the antenna's transmitting and receiving strength "is proportional to the number of turns and area of the loop."

U.S. patent application Ser. No. 09/951,032 (Mickle) which is a CIP of U.S. Pat. No. 6,289,237 discloses an antenna on a chip that has an effective area greater than its physical area. The effective area of the antenna is made greater than its physical area through the use of an LC tank circuit in the antenna. This is accomplished through the use in the (1) antenna of inter-electrode capacitance and inductance and jointly or severally the (2) parasitic capacitance and inductance of the chip (die) to form the LC tank circuit. The benefit of utilizing the inter-electrode capacitance and inductance and parasitic capacitance and inductance to form the LC tank circuit is that no additional discrete circuitry is required to provide the antenna with an effective area greater than its physical area. More important, the use of the LC tank circuit means that use of magnetic films around each antenna conductor is not required. This simplifies the production of the antenna on a chip and potentially allows the design of ultra-small antenna on a chip.

U.S. Pat. No. 6,289,237, the disclosure of which is incorporated herein by reference, discloses apparatus and a related method for energizing a remote station from a base station through the use of a suitable type of transmitted energy including RF power wherein the remote station does not contain a source of stored energy or a wired connection to a source of energy. Microprocessor controllers may be provided on the base station and remote station.

United States continuation-in-part application Ser. No. 09/951,032 which was based on the application which became U.S. Pat. No. 6,289,237 discloses the use of a chip containing an onboard antenna. The disclosure of this application is incorporated herein by reference.

Copending provisional application Ser. Nos. 60/406,541 and 60/411,845, the disclosures of which are incorporated herein by reference, disclose apparatus and methods for remote energizing of power storage devices and, particularly, small apparatus for remote energizing of power storage devices, using RF energy.

There remains a need for a method and associated apparatus which may be of small size and be structured to provide remote energizing of power storage devices employing RF energy preferably wherein the RF energy is within the frequency ranges employed in wireless fidelity (WiFi). There is a further need for such a device wherein the apparatus incorporates at least one antenna on the remote device which contains the power storage device which has an effective area greater than its physical one antenna in order to facilitate harvesting energy.

There is a need for small remote power charger device and associated method that have a means for receipt of transmitted energy from the environment and energizing power storage devices wherein the power charger device is not dependent on inductive charging.

Furthermore, there is a need for a small remote power charger device and associated method having a means for receipt of transmitted energy from the environment and energizing power storage devices using one or more antenna (e) on a substrate.

Finally, there is a need for a small remote power charger device and associated method that uses one or more antenna (e) on a substrate wherein the strength of the antenna is not dependent on magnetic induction or number of turns and area of the loop of the antenna.

BRIEF DESCRIPTION OF THE DRAWINGS

FIGS. 3a and 3b are, respectively, elevational and cross-sectional illustrations of an antenna on a remote station that has been printed.

FIG. 4 is an illustration of an experimental system.

DESCRIPTION OF THE PREFERRED EMBODIMENTS

As employed herein the term "wireless fidelity standards" means the Institute for Electrical and Electronic Engineers technical standards for networking including, but not limited to standards 802.11a (5.0 gigahertz), 802.11b (2.4 gigahertz), 802.11g (2.4 gigahertz), 802.16 (10.0 to 66.0 gigahertz), 802.20 (less than 3.5 gigahertz) and Bluetooth (2.4 gigahertz) and the associated frequencies which are shown in parentheses after each standard. A preferred wireless fidelity frequency for the present invention falls within the range of about 2.4 to 5.0 gigahertz.

As employed herein the term "wireless fidelity products" shall refer to devices having a remote station which employs a power storage device for energizing the same and is structured for wireless operation with products including, but not limited to, laptop computers, computer notebooks, PDAs, satellite radios and digital cameras. The term embraces a number of hand held electronic products.

As employed herein, the term "in space" means that energy or signals are being transmitted through the air or similar medium regardless of whether the transmission is within or partially within an enclosure, as contrasted with transmission of electrical energy by a hard wired or printed circuit boards.

Recharging Apparatus

Figure 1:
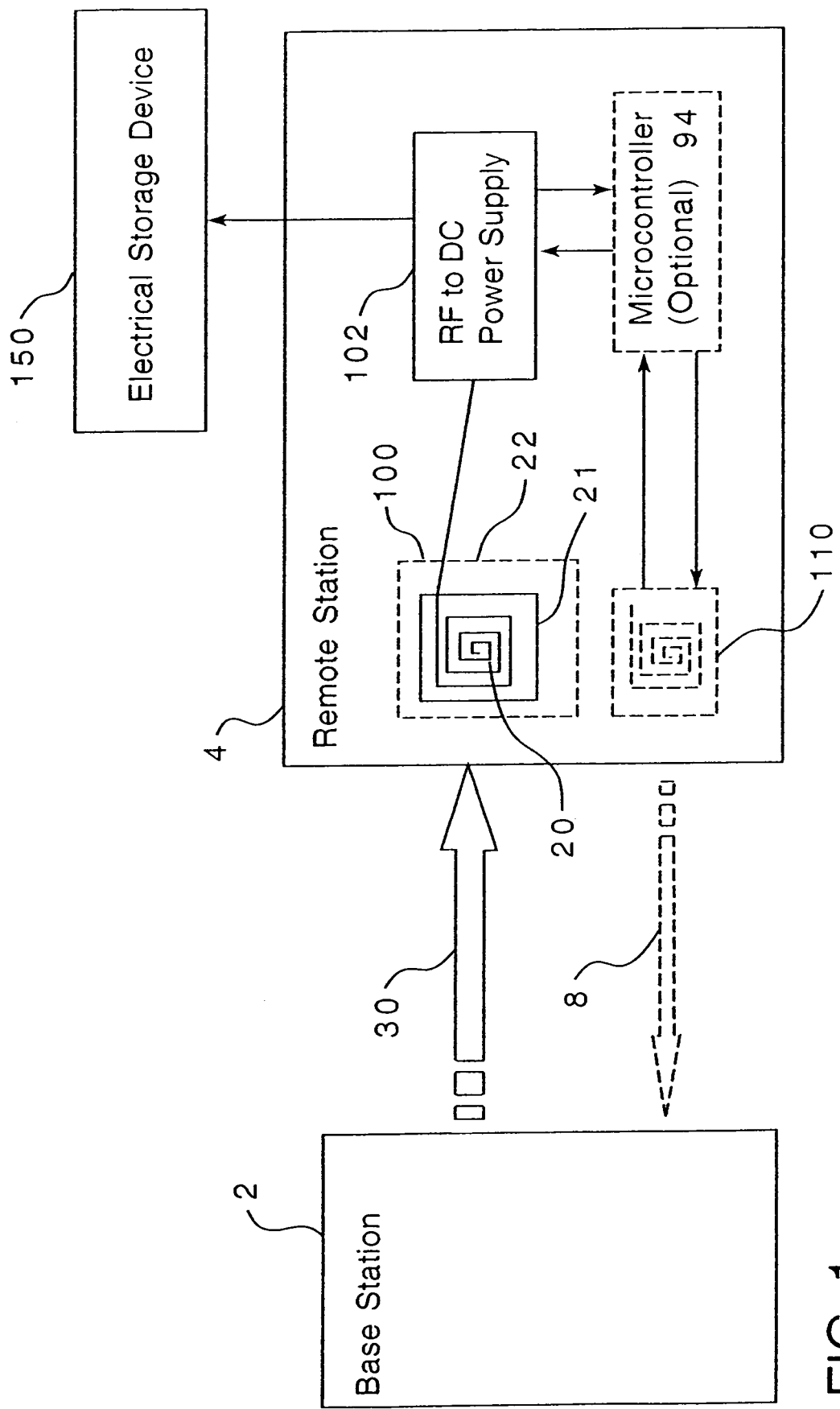
FIG. 1 is a schematic illustration of a recharging apparatus constructed and employable with the method of the invention.

The present invention has met the above-described needs. In one embodiment (FIG. 1), an apparatus and associated method for remote energizing of power storage devices comprises a base station (2) and a remote station (4). The base station (2) has means for transmitting energy (30) in space to the remote station (4). The transmission of energy (30) can be through RF within wireless fidelity standards. The remote station (4) has antenna 100 for receipt of the transmitted energy (30) and converting the transmitted energy by circuitry (102) into DC power for energizing the power storage device (150) on the object of interest. The receipt of the transmitted energy (30) on the remote station (4) of this invention is through one or more antennae (100) on the remote station (2) wherein at least one antenna (20) has an effective antenna area (22) greater than its physical area (2 1). The effective area (22) of the antenna is preferably made greater than its physical area through the use of an LC tank circuit in the antenna. The use of an antenna (100) that has an effective area greater (22) than its physical area (21) enables the creation of small remote stations that can be used to energize small electronic energy storage devices (150) such as wireless fidelity products. The remote station (4) may also include microcontroller (94) to store, manipulate and transmit information (8) through antenna (110) back to the base station (2).

The primary previous use of wireless fidelity has been for wireless transmission of data. The present invention facilitates the elimination of the need for a wired connection between a network and a wireless fidelity product. The prior art use of wireless fidelity devices over an extended period would require the need to physically connect the device to a power source in order to recharge the battery. As a result, the full benefits of wireless fidelity were not achieved. With the present invention, wireless methods are employed to recharge the power source, such as a battery, for example.

It will be appreciated that the present invention provides a method and apparatus for remote wireless charging employing wireless fidelity frequencies.

Ambient Energy Recharging Apparatus

Figure 2:
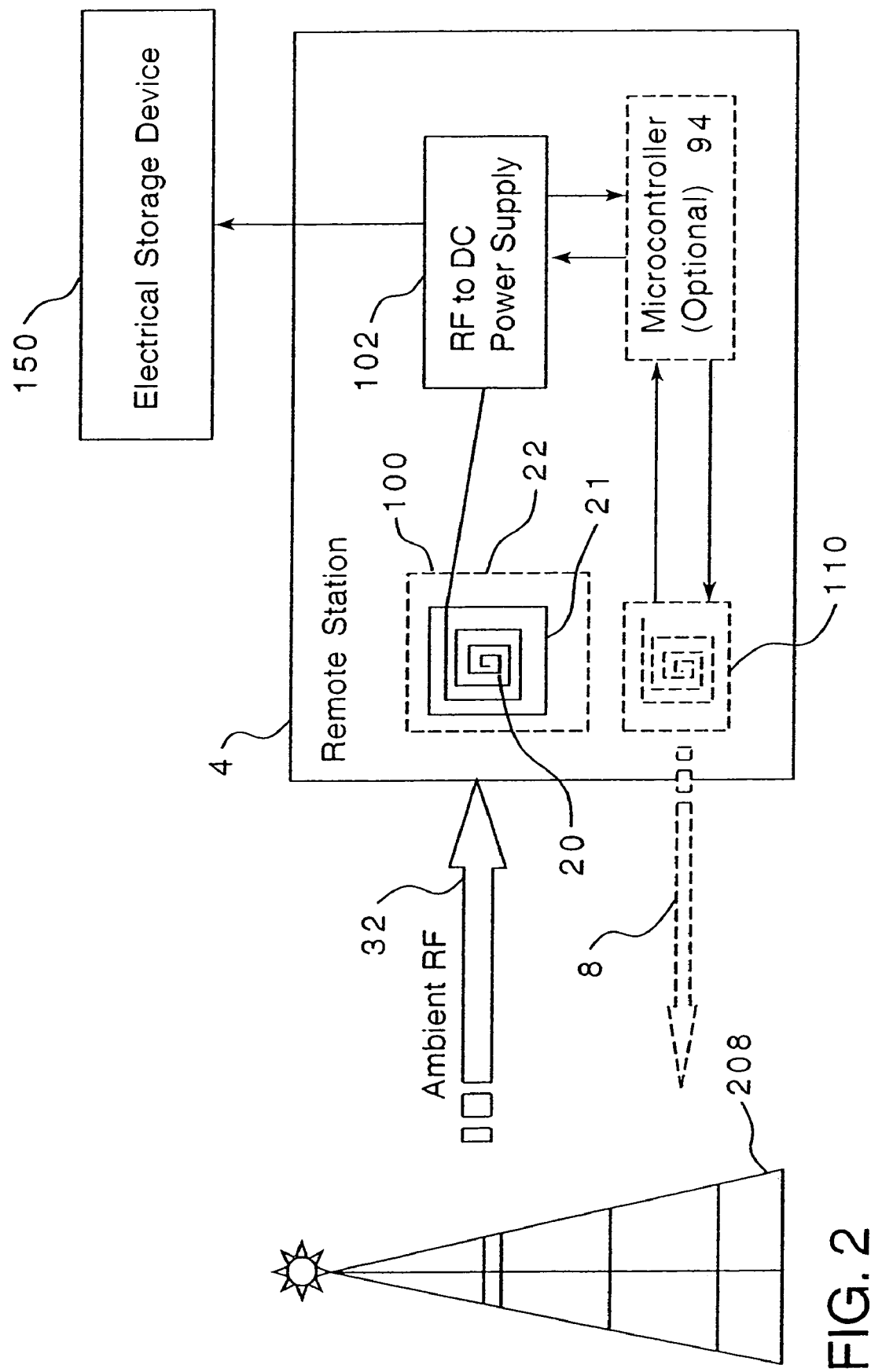
FIG. 2 is a schematic illustration of ambient energy recharging apparatus constructed in accordance with the invention.

In another embodiment (FIG. 2), an apparatus and associated method consist of a small remote station having a means for receipt of ambient RF energy (32) from the non-cooperating environment (208) and energizing power storage devices (150) of wireless fidelity products. The remote station (4) consists of one or more antennae (100) used to harvest the ambient energy (32) and circuitry (102) for converting this ambient energy into DC power for energizing power storage devices (150). The circuitry 102 may effect conversion to DC power by a charge pump, for example, or a one half wave rectifier. The effective area of the antenna (22) is made greater than its physical area (21) through the use of an LC tank circuit in the antenna. The use of an antenna (100) that has an effective area greater (22) than its physical area (21) enables the creation of small remote stations that can be used to energize small electronic energy storage devices (150). The remote station (4) may also include microcontroller (94) to store, manipulate and transmit information (8) back through antenna 110 to a base station (2) (not shown in this Figure).

Effective Area

For the different embodiments of this invention, the receipt of the transmitted energy on the remote station is through one or more antennae on the remote station wherein at least one antenna has an effective antenna area greater than its physical area. The effective area of the antenna is made greater than its physical area through the use of an LC tank circuit in the antenna. The use of an antenna that has an effective area greater than its physical area enables the creation of small remote stations that can be used to energize small electronic energy storage devices.

"Effective area" of the antenna refers to the fact that a tuned antenna may have an effective area that is larger than its geometric area. The phenomenon was explained by Reinhold Rudenberg in 1908 [Rudenberg, Reinhold, "Den Empfang Elektrischer Wellen in den Drahtlosen Telegraphie" ("The Receipt of Electric Waves in the Wireless Telegraphy") Annalen den Physik IV, 25, 1908, p. 446-466.] and the description has been expanded upon over the years by many other writers.

As stated in U.S. Pat. No. 5,296,866, "Rudenberg teaches that the antenna interacts with the incoming field, which may be approximately a plane wave, causing a current to flow in the antenna by induction. The [antenna] current, in turn, produces a field in the vicinity of the antenna, which field, in turn, interacts with the incoming field in such a way that the incoming field lines are bent. The field lines are bent in such a way that the energy is caused to flow from a relatively large portion of the incoming wave front, having the effect of absorbing energy from the wave front into the antenna from a wave front which is much larger than the geometrical area of the antenna."

While the concept of effective area may be known, implementing it in antenna design and construction is not easy or obvious. U.S. Pat. No. 5,296,866 teaches making active antennas that have greater effectiveness through use of discrete circuitry. U.S. Pat. No. 4,857,893 discloses the concept of making an antenna on a chip that use magnetic films around each antenna conductor in order to increase the inductance of the coil.

For data showing evidence of large effective area of antenna compared to the physical area on the antenna, please refer to U.S. patent application Ser. No. 09/951,032 (Mickle) which is a CIP of U.S. Pat. No. 6,289,237. Additionally, this application will provide discussion on conversion means from the transmitted energy to DC (or AC) voltage.

Printed Remote Station

One method of producing a remote station of this invention is through a semiconductor production technique that effectively creates a single monolithic chip assembly that includes all of the circuitry necessary to produce a functionally complete remote station. The chip can be in the form of a device selected from a CMOS device and/or a MEMS device.

Another method of producing a remote station of this invention is through printing of antenna and all of the circuitry necessary to produce a functionally complete remote station. A printed circuit board antenna that has an effective area greater than its physical area the antenna is shown in FIGS. 3a and 3b and can be constructed as follows:

a. An antenna is designed with specific electrode and interelectrode dimensions (414) so that when covered with, or deposited on, a substrate of appropriate capacitance, an LC "tank" circuit will form.

b. The antenna design is printed onto a non-conductive substrate (plastic film, glass, etc.) (401) using commercially available conductive compositions (i.e., conductive epoxy, conductive ink, etc.). The design (414) may be printed using standard printing techniques such as ink jet, silkscreen, and the like.

c. A film of material (412) that has specific capacitance and insulating properties is printed on top of the antenna. This film (412) will provide the antenna to for the LC "tank" circuit.

Other electronic items such as diodes (not shown) can then be printed onto the substrate in order to form a printed charge device of this invention.

EXAMPLE

The apparatus shown in FIG. 4 was employed to confirm the concept of the present invention. The apparatus in FIG. 4 is a board mounted experimental system which has a voltmeter 424 which is connected through electrical leads 440-442 and 441-444 to terminals of the test unit 428. Antenna 430 is connected to circuitry 434 by electrical lead 450 with cellphone battery 432 being positioned adjacent to the circuitry 434. Using the apparatus employed in FIG. 4, in a period of approximately forty minutes, the voltage on the cellphone battery was increased from 2.888 volts to 2.890 volts which confirms the ability to charge a power source employing wireless fidelity in a wireless manner. Although the antenna was in the proper frequency band, the energy harvesting battery charging circuit was designated a 915 MHz as opposed to a 2.5 GHz source. In addition, the diodes of the charge pump used for the energy harvesting were only specified at approximately 1 GHz. Nevertheless, the experiment confirmed the ability to harvest energy from a wireless fidelity access point to increase the voltage thereby indicating an increase in charge on the battery.

In general, the method and apparatus of the present invention may advantageously be employed with remote stations of small dimensions although the invention is not so limited. For example, the remote station including the power storage device may have a width of less than about 12 inches, a length of less than about 12 inches and a thickness of less than about 2 inches.

It will be appreciated that the present invention provides a method of energizing a power storage device wherein a source of energy is transmitted from a base station to a remote station. The energy may be RF power within the frequencies of wireless fidelity standards. The antenna receives the energy and the circuitry on the remote station provides for conversion of the energy into DC power which is subsequently delivered to the power storage device.

The invention may be employed advantageously in small printed circuit board applications, for example, in circuit boards being of square configuration having a side dimension of about 5 mm to 5 cm.

The method and apparatus preferably includes employing as the antenna an antenna formed on an electronic chip or a printed circuit board. The antenna may be formed by printing on a substrate on the remote station, employing conductive and electrically insulating portions. The remote station may employ an LC tank circuit in association with the antenna or in the antenna to establish an effective area of the antenna greater than the physical area.

Whereas particular embodiments of the invention have been described hereinabove for purposes of illustration, it will be evident to those skilled in the art that numerous variations of the details may be made without departing from the invention as defined in the appended claims.

Whereas particular embodiments of the invention have been described hereinabove for purposes of illustration, it will be evident to those skilled in the art that numerous variations of the details may be made without departing from the invention as defined in the appended claims.

We claim:

1. A method of energizing a power storage device of a remote station, comprising:
providing said remote station with an energy receiving antenna for receiving ambient energy in the form of RF frequencies falling within the range of about 2.4 to 5.875 gigahertz or about 10.0 to 66.0 gigahertz from the environment, said energy receiving antenna having an effective antenna area greater than its physical area,
employing an LC tank circuit in said energy receiving antenna to establish said effective area of the antenna greater than said physical area, said LC tank circuit being formed by providing the energy receiving antenna with specific electrode and interelectrode dimensions and covering the energy receiving antenna with a film of material having a specific capacitance, thereby causing said LC tank circuit to be formed,
receiving said ambient energy by said energy receiving antenna and converting said energy to DC power, and
energizing said power storage device with said DC power.

2. The method of claim 1 including said remote station being a component of a wireless fidelity product.

3. The method of claim 1 including said remote station includes a wireless fidelity product.

4. The method of claim 1 including said remote station being operatively associated with a wireless fidelity product.

5. The method of claim 1, further comprising using the DC power to cause information to be transmitted from said remote station through a transmit antenna provided on said remote station that is separate from said energy receiving antenna.

6. The method of claim 5, wherein said remote station includes a microcontroller and wherein said step of using the DC power to cause information to be transmitted from said remote station comprises using the DC power to power said microcontroller, said microcontroller when powered causing said information to be transmitted from said remote station through said transmit antenna.

7. The method of claim 1, wherein the transmitted energy in the form of RF frequencies falls within the range of about 2.4 to 5.0 gigahertz or about 10.0 to 66.0 gigahertz.

8. A method of energizing a power storage device of a remote station, comprising:
providing said remote station with an energy receiving antenna for receiving ambient energy in the form of RF frequencies falling within the range of about 2.4 to 5.875 gigahertz or about 10.0 to 66.0 gigahertz from the environment, said energy receiving antenna having an effective antenna area greater than its physical area,
employing an LC tank circuit in said energy receiving antenna to establish said effective area of the antenna greater than said physical area, said LC tank circuit being formed by providing the energy receiving antenna with specific electrode and interelectrode dimensions and depositing the energy receiving antenna on a substrate having a specific capacitance, thereby causing said LC tank circuit to be formed,
receiving said ambient energy by said energy receiving antenna and converting said energy to DC power, and
energizing said power storage device with said DC power.

9. The method of claim 8 including said remote station being a component of a wireless fidelity product.

10. The method of claim 8 including said remote station includes a wireless fidelity product.

11. The method of claim 8 including said remote station being operatively associated with a wireless fidelity product.

12. The method of claim 8 further comprising using the DC power to cause information to be transmitted from said remote station through a transmit antenna provided on said remote station that is separate from said energy receiving antenna.

13. The method of claim 12, wherein said remote station includes a microcontroller and wherein said step of using the DC power to cause information to be transmitted from said remote station comprises using the DC power to power said microcontroller, said microcontroller when powered causing said information to be transmitted from said remote station through said transmit antenna.

14. The method of claim 8, wherein the transmitted energy in the form of RE frequencies falls within the range of about 2.4 to 5.0 gigahertz or about 10.0 to 66.0 gigahertz.

15. A remote station for energizing a power storage device of a wireless fidelity product, comprising:
one or more antennae for receiving transmitted energy in the form of RF frequencies falling within the range of about 2.4 to 5.875 gigahertz or about 10.0 to 66.0 gigahertz from the environment;
circuitry for converting said transmitted energy into DC power for energizing said power storage device, and
at least one of said one or more antennae having an effective antenna area greater than its physical area, wherein the effective area of the at least one of said one or more antennae is made greater than its physical area through the use of an LC tank circuit in said at least one of said one or more antennae, wherein said LC tank circuit is formed by providing the at least one of said one or more antennae with specific electrode and interelectrode dimensions and covering the at least one of said one or more antennae with a film of material having a specific capacitance, thereby causing said LC tank circuit to be formed.

16. The remote station of claim 15, further comprising a transmit antenna that is separate from said one or more antennae, wherein the DC power is used to cause information to be transmitted from said remote station through said transmit antenna.

17. The remote station of claim 16, further comprising a microcontroller operatively coupled to said transmit antenna, wherein the DC power is used to power said microcontroller, said microcontroller when powered causing said information to be transmitted from said remote station through said transmit antenna.

18. The remote station of claim 15, wherein the transmitted energy in the form of RE frequencies falls within the range of about 2.4 to 5.0 gigahertz or about 10.0 to 66.0 gigahertz.

19. A remote station for energizing a power storage device of a wireless fidelity product, comprising:
  one or more antennae for receiving transmitted energy in the form of RF frequencies falling within the range of about 2.4 to 5.875 gigahertz or about 10.0 to 66.0 gigahertz from the environment;
  circuitry for converting said transmitted energy into DC power for energizing said power storage device, and at least one of said one or more antennae having an effective antenna area greater than its physical area, wherein the effective area of the at least one of said one or more antennae is made greater than its physical area through the use of an LC tank circuit in said at least one of said one or more antennae, wherein said LC tank circuit is formed by providing the at least one of said one or more antennae with specific electrode and interelectrode dimensions and depositing the at least one of said one or more antennae on a substrate having a specific capacitance, thereby causing said LC tank circuit to be formed.

20. The remote station of claim 19, further comprising a transmit antenna that is separate from said one or more antennae, wherein the DC power is used to cause information to be transmitted from said remote station through said transmit antenna.

21. The remote station of claim 20, further comprising a microcontroller operatively coupled to said transmit antenna, wherein the DC power is used to power said microcontroller, said microcontroller when powered causing said information to be transmitted from said remote station through said transmit antenna.

22. The remote station of claim 19, wherein the transmitted energy in the form of RF frequencies falls within the range of about 2.4 to 5.0 gigahertz or about 10.0 to 66.0 gigahertz.

* * * * *

UNITED STATES PATENT AND TRADEMARK OFFICE
CERTIFICATE OF CORRECTION

PATENT NO. : 7,383,064 B2  
APPLICATION NO. : 11/266139  
DATED : June 3, 2008  
INVENTOR(S) : Marlin H. Mickle et al.

Page 1 of 1

It is certified that error appears in the above-identified patent and that said Letters Patent is hereby corrected as shown below:

Column 1, line 42, "energized" should be --energize--.
Column 2, line 50, "in order" should be --in order to--.
Column 6, line 27, "physical area the" should be --physical area of the--.
Column 6, line 42, "antenna to for" should be --antenna to form--.
Column 7, lines 35 through 39, should be deleted. This is a duplication of Column 7, lines 30-34.
Column 8, line 52, "RE" should be --RF--.

Signed and Sealed this

Twenty-eighth Day of October, 2008

JON W. DUDAS
*Director of the United States Patent and Trademark Office*